United States Patent [19]
Krauss et al.

[11] Patent Number: 6,035,927
[45] Date of Patent: Mar. 14, 2000

[54] TUBE/FIN BLOCK FOR A HEAT EXCHANGER AND MANUFACTURING PROCESS THEREFOR

[75] Inventors: Hans-Joachim Krauss; Karl-Heinz Staffa, both of Stuttgart, Germany

[73] Assignee: Behr GmbH & Co., Stuttgart, Germany

[21] Appl. No.: 09/112,147

[22] Filed: Jul. 9, 1998

[30] Foreign Application Priority Data

Jul. 9, 1997 [DE] Germany .......................... 197 29 239

[51] Int. Cl.[7] ..................................... F28F 13/00
[52] U.S. Cl. ...................... 165/135; 165/152; 29/890.46; 228/183
[58] Field of Search ..................... 165/135, 140, 165/152; 29/890.03, 890.046; 228/183

[56] References Cited

U.S. PATENT DOCUMENTS

| | | | |
|---|---|---|---|
| 4,738,306 | 4/1988 | Tamba et al. | |
| 5,000,257 | 3/1991 | Shinmura | 165/140 |
| 5,033,540 | 7/1991 | Tategami et al. | 165/135 |
| 5,180,004 | 1/1993 | Nguyen | 165/140 |
| 5,509,199 | 4/1996 | Beamer et al. | 29/890.07 |
| 5,671,806 | 9/1997 | Schmalzreid | 165/81 |
| 5,720,341 | 2/1998 | Watanabe et al. | 165/135 |

FOREIGN PATENT DOCUMENTS

| | | |
|---|---|---|
| 2148346 | 3/1973 | France . |
| 183278 | 2/1955 | Germany . |
| 2115434 | 10/1971 | Germany . |
| 4226875 | 2/1993 | Germany . |
| 19541121 | 5/1996 | Germany . |
| 19536116 | 4/1997 | Germany . |
| 19649129 | 5/1998 | Germany . |

*Primary Examiner*—Allen Flanigan
*Attorney, Agent, or Firm*—Evenson, McKeown, Edwards & Lenehan, P.L.L.C.

[57] ABSTRACT

A tube/fin block for a heat exchanger has several tubes through which a heat transfer fluid can flow arranged side-by-side along a transverse direction of the block. Corrugated-fin complexes are inserted between respective adjacent tubes and are connected with the adjacent tubes. At least one of the corrugated fin-complexes is a double corrugated-fin complex with two corrugated-fin units arranged side-by-side in the transverse direction of the block. A particular manufacturing process for the tube/fin block is utilized. A heat insulation device is provided between the two corrugated fin units. A non-solderable spacer plate can be inserted between the two corrugated fin units and pulled out after the tube/fin block is soldered together so that a heat-insulating gap is formed. A plastic strip can be inserted into the heat-insulating gap as required. The block is appropriate for use, for example, in condensers and evaporators of motor vehicle air conditioners.

21 Claims, 3 Drawing Sheets

TUBE/FIN BLOCK FOR A HEAT EXCHANGER AND MANUFACTURING PROCESS THEREFOR

This application claims the priority of Application No. 197 29 239.9, filed in Germany on Jul. 9, 1997.

BACKGROUND AND SUMMARY OF THE INVENTION

This invention relates to a particular tube/fin block construction for a heat exchanger having several tubes arranged side-by-side along a transverse direction of the block and through which a heat transfer fluid can flow. Corrugated-fin complexes are inserted between adjacent tubes and are connected with the adjacent tubes. At least one of the corrugated fin-complexes is a double corrugated-fin complex with two corrugated-fin units arranged side-by-side in the transverse direction of the block. The invention also relates to a process for manufacturing such a tube/fin block. Heat exchangers with such a tube/fin block are used, for example, as condensers and evaporators in motor vehicle air conditioners and may have the form, for example, of flat-tube heat exchangers in a serpentine-type construction.

In German Patent Application No. 196 49 129.0, a flat-tube heat exchanger having a tube/fin block of the initially mentioned type is described in which double corrugated-fin complexes are inserted between respective adjacent tubes and which the two corrugated-fin units of the double corrugated-fin complexes, which are arranged side-by-side in the transverse direction of the block, are separated from one another by a massive continuous separating plate. The two corrugated-fin units, on one side, are soldered to the separating plate and, on the other side, are soldered to the respective adjoining flat tubes. A sufficient distance is to be created by the double corrugated-fin complexes between two adjacent flat tubes respectively in order to twist the flat tube ends by 90° without hindering one another and permit inserting them into a pertaining distributing or collecting tube.

A heat exchanger disclosed in German Published Patent Application DE 195 36 116 A1 has a tube/fin block of the initially mentioned type which is divided into two areas in which a massive supporting metal plate instead of one of several parallel linear flat tubes is provided. A respective division of the lateral distributing and collecting tubes corresponds to this division of the tube/fin block. The purpose of this measure consists of integrating two separate heat transfer fluid circulating systems in the heat exchanger, for example, for implementing an integrated condenser—oil cooler unit for a motor vehicle.

SUMMARY OF THE INVENTION

The present invention addresses the technical problem of providing a tube/fin block of the initially mentioned type in which measures are taken for the thermal decoupling of at least two adjacent tubes as well as the technical problem of providing a manufacturing process for such a tube/fin block.

The invention solves these problems by providing a tube/fin block of the initially mentioned type which has a heat insulation device provided between the two corrugated-fin units of the double corrugated-fin complex as well as by providing a manufacturing process for manufacturing such a tube/fin block including the operations or steps of constructing the tube/fin block from tubes and corrugated-fin complexes, carrying out a soldering process with the constructed tube/fin block for brazing the tubes to the corrugated-fin complexes, and removing a spacer plate from the soldered tube/fin block to form a heat-insulating air gap between two corrugated-fin units of a double corrugated-fin complex. The process may further include inserting a plastic strip into the heat-insulating air gap formed by removal of the spacer plate.

In preferred embodiments of the tube/fin block according to the invention, a heat insulation device is provided between the two corrugated-fin units of the at least one double fin complex. As a result, heat transfer between the two corrugated-fin units can be prevented or at least reduced to a desired degree. Correspondingly, the two tubes spaced from one another by this double corrugated-fin complex are thermally decoupled. This is expedient, for example, for a heat exchanger in a serpentine-type construction in which an inlet-side section of serpentine-type tubing is situated opposite an outlet-side section of adjacent serpentine-type tubing. A double corrugated-fin complex with the heat insulation device inserted between the two tubing sections prevents or reduces an undesirable heat transfer between these two tubing sections, which normally have different temperatures during operation.

According to further features of preferred embodiments of the invention, the heat insulation device is formed by a perforated separating plate. Since its openings have no, or at least no significant, heat conductivity but do have a heat insulating effect, the heat conductivity of the perforated separating plate is clearly reduced in comparison to a massive separating plate. The larger the surface proportion of the openings, the higher the heat-insulating effect of the perforated separating plate.

According to further features of preferred embodiments of the invention, the heat insulation device is formed by a profiled separating plate which is provided with punctiform or linear projections, such as beads, on one or both of its sides. This results in an at most line-type contact of the two corrugated-fin units of the double corrugated-fin complex with a correspondingly low heat conductivity.

According to additional features of preferred embodiments of the invention, the heat insulation device is formed by a separating metal plate which is provided, at least on one side, with a heat-insulating coating which prevents a noticeable heat transfer through the separating metal plate. Since, as a result of the heat-insulating coating, brazing of the separating metal plate to the adjoining corrugated-fin units may not be possible, according to a further development of the invention, the separating metal plate may be provided with position securing devices which secure it with respect to a moving-out of the tube/fin block.

According to yet further features of preferred embodiments of the invention, the heat insulation device is formed by a heat-insulating air gap. Such a tube/fin block can advantageously be produced by a process including the particular steps or operations of constructing the tube/fin block from tubes and corrugated-fin complexes carrying out a brazing process with the constructed tube/fin block for brazing the tubes to the corrugated-fin complexes, and removing a spacer plate from the soldered tube/fin block to form a heat-insulating air gap between the two corrugated-fin units of the double corrugated-fin complex. The two corrugated-fin units of a respective end plate may adjoin the air gap or, as an alternative, may be situated directly opposite each other by way of the air gap. Particularly in the latter case, it is advantageous, as a further development of the invention, to manufacture the corrugated-fins of a non-solder-plated material and, for manufacturing the tube/fin block, to provide the tubes with solder by a brazing operation.

In further developments of the invention, the heat insulation device is formed by a plastic strip having a low heat conductivity which largely prevents a heat transfer between the two adjoining corrugated-fin units. Such a tube/fin block can be produced, for example, by a process including the operations of removing a spacer plate from the soldered tube/fin block to form the heat-insulating air gap, and inserting a plastic strip into the heat-insulating air gap formed by the removal of the spacer plate which is advantageous in that the plastic strip does not have to be resistant to the temperatures used during the brazing process because it is inserted after the soldering process.

According to further features of preferred embodiments of the invention, at least one of the two corrugated-fin units of the double corrugated-fin complex is provided, on its side facing the air gap or the plastic strip, with a metal end plate, which is advantageous particularly for pulling-out a spacer plate inserted for the brazing process and possibly for inserting the plastic strip.

In further developments of preferred embodiments of the invention, the heat insulation device is formed of a non-woven ceramic element or mineral fiber material. Such a nonwoven element also has a desired low heat conductivity. In a further development of this measure, the nonwoven element is accommodated in a U-shaped separating metal plate with flanks which act as metal end plates of the adjoining corrugated-fin units. In its bending edge area, the separating metal plate has a perforated construction in order to prevent a significant heat transfer between the two flanks of the separating metal plate over the bending edge area.

Finally, according to further features of the invention, the heat insulation device is formed by two metal end plates which, only by way of projections provided on one or both of the mutually opposite metal end plate sides, rest against one another in a punctiform or linear manner while, on an exterior side, the plates are connected with the respective adjoining corrugated-fin unit. By the at most linear contacting of the two metal end plates, a noticeable heat transfer between the latter is avoided.

Advantageous constructions of preferred embodiments of the invention are illustrated in the drawings and will be described. Other objects, advantages and novel features of the present invention will also become apparent from the following detailed description of the invention when considered in conjunction with the accompanying drawings.

DESCRIPTION OF THE PREFERRED EMBODIMENTS

Figure 1:
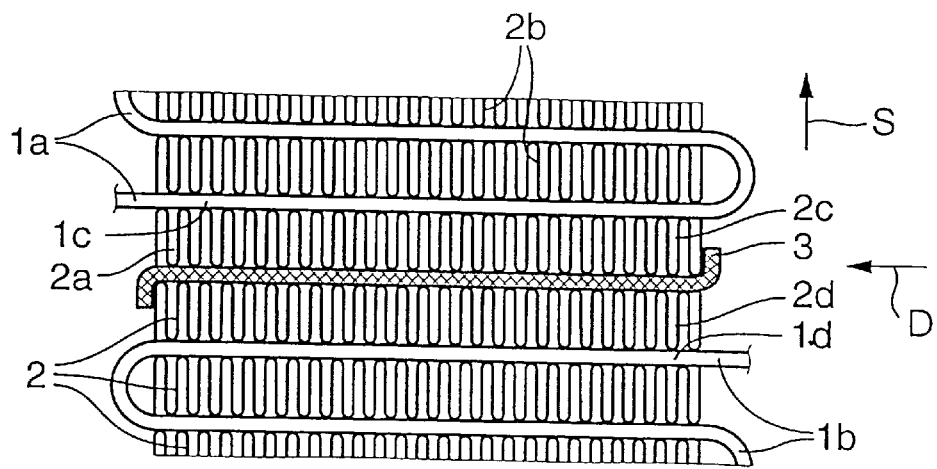
FIG. 1 is a cutout-type lateral view of a tube/fin block for a multi-flow flat-tube heat exchanger with a serpentine-type construction.

As a cutout, FIG. 1 illustrates a tube/fin block for a multi-flow heat exchanger in a serpentine-type construction which contains several serpentine-type tubings 1a, 1b and corrugated-fin complexes 2 between two adjacent linear serpentine-type tubing sections respectively. For reasons of simplicity, the center section of the tube/fin block is illustrated in a shortened fashion in FIG. 1. The corrugated-fin complexes 2 are used, on the one hand, for mechanically stabilizing the tube/fin block and, on the other hand, for increasing the heat transfer between a heat transfer fluid guided through the serpentine-type tubings 1a, 1b and a medium which is guided away perpendicularly to the plane of the drawing of FIG. 1 on the exterior side of the tube over the tube/fin block.

Two serpentine-type tubings respectively of the several serpentine-type tubings 1a, 1b which are arranged side-by-side in a row along the transverse direction S of the block are situated opposite one another by connection sections 1c, 1d which lead on opposite sides out of the tube/fin block and into an assigned distributor or collector which is not shown. This means that, of the mutually opposite connection sections 1c, 1d of adjacent serpentine-type tubings 1a, 1b, one forms an inlet-side tubing section and the other forms an outlet-side tubing section. However, during operation of the heat exchanger, a heat transfer fluid which normally flows through these sections 1c, 1d varies in temperature because, depending on the function of the heat exchanger, the heat transfer fluid absorbs or delivers heat while it flows through the parallel serpentine-type tubings. Correspondingly, a heat transport between the two connection-side tube sections 1c, 1b of adjacent serpentine-type tubings 1a, 1b is undesirable because such heat transport reduces the efficiency of the heat exchanger.

In order to prevent this undesirable heat transport or at least reduce it to an acceptable degree, one thermally decoupling double corrugated-fin complex 2a respectively is provided between the opposite connection-side tube sections 1c, 1d of adjacent serpentine-type tubings 1a, 1b, while between the individual linear tubing sections within each serpentine-type tubing 1a, 1b, a conventional single corrugated-fin unit 2b is inserted. The thermally decoupling double corrugated-fin complex 2a consists of two corrugated-fin units 2c, 2d, which are arranged side-by-side in the transverse direction S of the block, and of a flat heat insulation device 3 which is situated between the corrugated-fin units 2c, 2d. In the following, various advantageous implementations of this heat insulation device 3, which causes the thermal decoupling function of the double corrugated-fin complex 2a, will be explained in detail.

Figure 2:
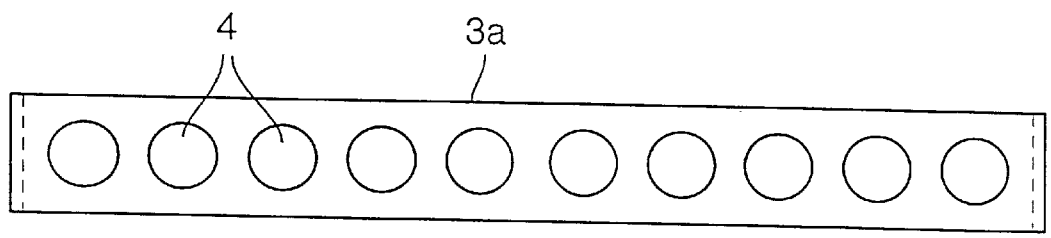
FIG. 2 is a top view of a perforated separating metal plate which can be used in the tube/fin block of FIG. 1 as a heat insulation device of a thermally decoupling double corrugated-fin complex.

In the example of FIG. 2, the heat insulation device is formed by a separating metal plate 3a which is provided with circular openings 4. Like, for example, the serpentine-type tubings 1a, 1b, the separating metal plate 3a consists of aluminum. As a result, the separating metal plate 3a can be soldered to the two adjoining corrugated-fin units 2c, 2d in the same brazing process in which the corrugated-fin complexes 2, which are also manufactured of aluminum, are soldered to the serpentine-type tubings 1a, 1b. In the area of the openings 4, the heat transfer degree between the two corrugated tube units 2c, 2d of the double corrugated-fin complex 2a is virtually negligible or at least sufficiently low. The larger the surface proportion of the openings 4, the higher the thermally decoupling effect of the perforated separating metal plate 3a. With the secondary prerequisite that a residual separating metal plate surface remains which is capable of transmitting the pressing required for the brazing, the surface proportion of the openings 4 is selected to be as large as possible.

Figure 3:
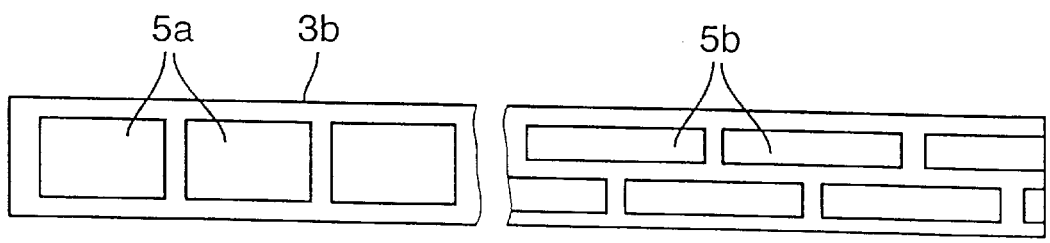
FIG. 3 is a view corresponding to FIG. 2 but for a separating metal plate with a modified hole pattern.

Instead of the separating metal plate 3a of FIG. 2 provided with circular openings 4, other separating metal plates with modified hole patterns can be used as heat insulation devices. Thus, FIG. 3 illustrates another thermally decoupling, perforated separating metal plate 3b made of aluminum which is provided with a hole pattern of various rectangular openings 5a, 5b. As another alternative, the use of perforated sheets is considered. In all cases, in contrast to a massive continuous separating metal plate made of aluminum, the hole pattern results in a significant reduction of the heat conductivity and therefore in considerable thermal decoupling of the adjoining corrugated-fin units 2c and 2d of the double corrugated-fin complex 2a and consequently of the tubing sections 1c, 1d of the tube/fin block which are spaced from one another by this double corrugated-fin complex 2a. As an alternative to a perforated separating metal plate, the use of a profiled separating metal plate which is provided on one or both sides with punctiform or linear projections is conceivable; such a construction results in only a punctiform or linear contact of the two corrugated-fin units with a correspondingly low heat transfer capability.

Figure 4:
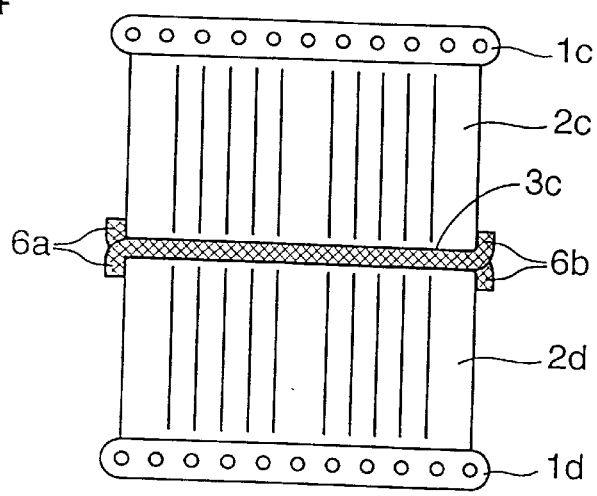
FIG. 4 is a schematic lateral view in the direction of the arrow D of FIG. 1 of a thermally decoupling double corrugated-fin complex which has a heat-insulatingly coated separating metal plate and which can be used for the tube/fin block of FIG. 1.

FIG. 4 is a lateral view in the direction of arrow D of FIG. 1 and illustrates another possible configuration of the thermally decoupling double corrugated-fin complex 2a. In this example, between the two corrugated-fin units 2c, 2d of the double corrugated-fin complex 2a, which is situated between the two connection-side tubing sections 1c, 1d of adjacent serpentine-type tubings, a separating metal sheet 3c of aluminum is inserted as a heat insulation device which is provided on both sides with a heat-insulating ceramic coating, for example, of aluminum nitride. The coating can be applied, for example, by a plasma spraying or vaporizing process. The two-sided ceramic coating causes the thermal decoupling of the two adjoining corrugated-fin units 2c, 2d. Since the coating material is not solderable, the coated separating metal plate 3c is not connected by the brazing process for the tube/fin block with the adjoining corrugated-fin units 2c, 2d. In order to nevertheless prevent a sliding-out of the separating metal plate 3c, the separating metal plate 3c is manufactured with a slightly larger width than the corrugated-fin units 2c, 2d and, on the resulting side edges which protrude on both sides, is bent to form holding tabs 6a, 6b, of which, on each side, at least one rests against one corrugated-fin unit and at least one other rests against the other adjoining corrugated-fin unit.

Figure 5:
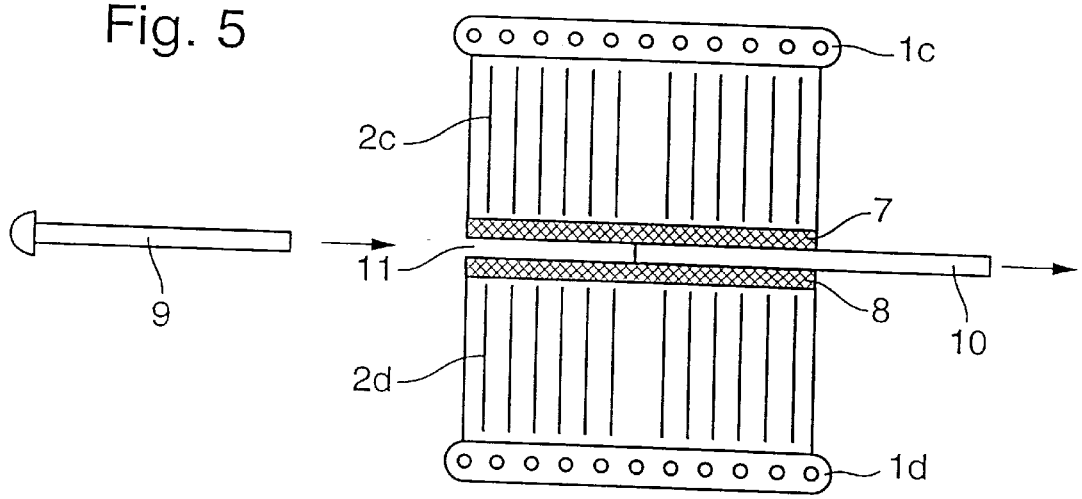
FIG. 5 is a schematic lateral view corresponding to FIG. 4 but for a modified double corrugated-fin complex in a manufacturing stage shortly before its completion.

In a view which corresponds essentially to that of FIG. 4, FIG. 5 illustrates another possible configuration of a thermally decoupling double corrugated-fin complex between the two adjacent tubing sections 1c, 1d. In this configuration, the mutually facing sides of the two corrugated-fin units 2c, 2d of the double corrugated-fin complex are provided with respective soldered-on metal end plates 7, 8, and the two metal end plates 7, 8 are spaced from one another in order to define either a heat-insulating air gap 11 or a space within which a heat-insulating plastic strip 9 may be inserted. This, in turn, causes the desired thermal decoupling of the two corrugated-fin units 2c, 2d.

For manufacturing the tube/fin block with this type of a thermally decoupling double corrugated-fin complex, the tube/fin block is constructed first, in which case the respective metal end plate 7, 8 is arranged on the two mutually opposite sides of the corrugated-fin units 2c, 2d of the double corrugated-fin complex, and a metal spacer plate 10 made of a non-solderable material, for example, of special steel or of a ceramically coated strip material, is inserted between the two metal end plates 7, 8. When special steel is used for the metal spacer plate 10, the latter is provided with a coating, for example, made of chalk or graphite, which cannot be wetted by the solder which is used in the subsequent brazing process. Then the constructed tube/fin block is subjected to a brazing process in order to solder the corrugated-fin complexes to the tubes, in which case the two metal end plates 7, 8 are simultaneously soldered to the respective corrugated fin unit 2c, 2d of the double corrugated-fin complex. The metal spacer plate 10, which is resistant to the brazing process temperatures, during the brazing process, is not connected with the adjoining metal end plates 7, 8 and can therefore be laterally pulled out in the direction illustrated by the arrow after the brazing process. The heat-insulating plastic strip 9 can now be inserted in the resulting gap 11 laterally between the two metal end plates 7, 8 as the heat insulation device. The plastic strip 9 acts simultaneously as an air closing strip, which is desirable for some applications. Therefore, in this manufacturing process, the material of the plastic strip 9 must not be designed with respect to a resistance to the temperature during the brazing process, but can be selected specifically to provide a high heat insulation capacity.

As an alternative to inserting the plastic strip 9 illustrated in FIG. 5, as required, the gap 11 may remain between the two metal end plates 7, 8 after it is created by the pulling-out of the metal spacer plate 10. The gap 11 will then act as a heat-insulating air gap between the two adjoining corrugated-fin units 2c, 2d. As another alternative, the metal end plates 7, 8 can be eliminated. The tube/fin block will then be soldered together without using the metal end plates. For this purpose, for example, the corrugated fins may consist of non-solder-plated material and the tubes may be provided with solder.

Figure 6:
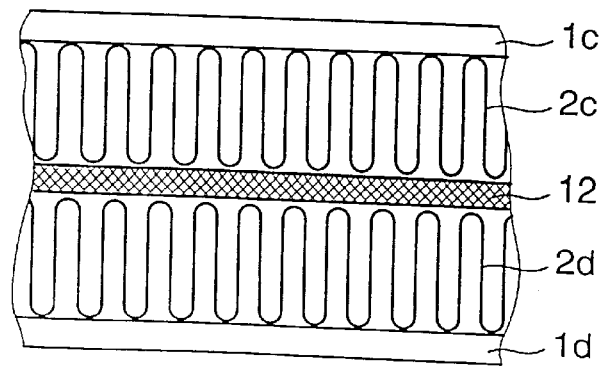
FIG. 6 is a schematic, cutout-type lateral view of another double corrugated-fin complex including a heat-insulating nonwoven element and which can be used for the tube/fin block of FIG. 1.

In a cutout-type lateral view corresponding to FIG. 1, FIG. 6 illustrates another configuration of a thermally decoupling double corrugated-fin complex between the two adjacent tubing sections 1c, 1d. In this example, a nonwoven element 12 made of a heat-insulating material, for example, of a ceramic material or of a mineral fiber material, is inserted as the heat insulating device between the two corrugated-fin units 2c, 2d of the double corrugated-fin complex. The nonwoven element prevents a mutual interlocking of the two adjoining corrugated-fin units 2c, 2d and absorbs excess solder of the corrugated-fin units 2c, 2d during the brazing process without being soldered to them. As an alternative to leaving the nonwoven element 12 as the heat insulation device, the nonwoven element 12 may be pulled out after the brazing process, after which the resulting gap between the two corrugated-fin units 2c, 2d will then act as a heat-insulating air gap.

Figure 7:
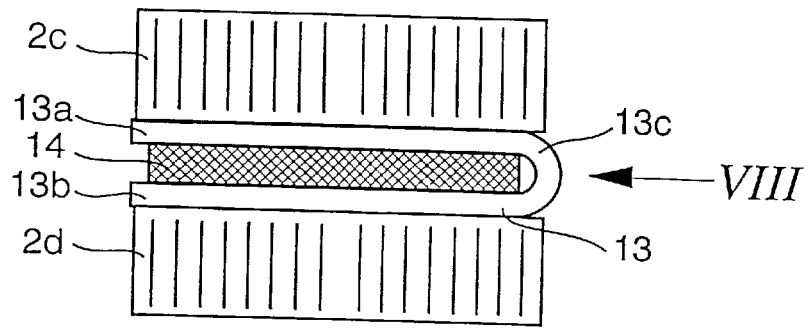
FIG. 7 is a schematic lateral view of another double corrugated-fin complex which has nonwoven material accommodated in a U-shaped separating metal plate and can be used for the tube/fin block of FIG. 1.
Figure 8:
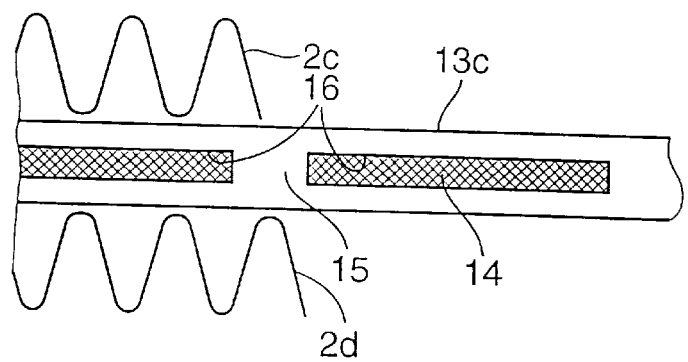
FIG. 8 is a cutout-type lateral view in the direction of the arrow VIII of FIG. 7.

FIGS. 7 and 8 illustrate another configuration of the thermally decoupling double corrugated-fin complex for the tube/fin block of FIG. 1. In this example, a U-shaped solderable separating metal sheet 13 is inserted between the two corrugated-fin units 2c, 2d of the double corrugated-fin complex. A nonwoven element 14 made of a heat-insulating material is inserted into the interior of the separating metal plate 13. By its flanks 13a, 13b, the U-shaped separating metal plate 13 is soldered on its exterior side to the respectively adjoining corrugated-fin unit 2c, 2d. In its bending edge area 13c, the separating metal plate 13 is provided with openings 16 which are situated side-by-side in a row and which are spaced from one another by narrow webs 15, as illustrated more clearly by FIG. 8. Because of the heat-insulating nonwoven element 14 and the heat-insulating openings 16 in the separating metal plate bending edge area 13c, no noticeable heat transfer takes place between the two separating metal plate flanks 13a, 13b and thus between the adjoining corrugated-fin units 2c, 2d, which, in turn, ensures the thermally decoupling effect of the double corrugated-fin complex. As required, the two free end edges of the U-shaped separating metal plate 13, instead of, as illustrated, ending open, may be folded over while leaving a heat-insulating air gap, so that the nonwoven element 14 is securely enclosed against removal.

Figure 9:
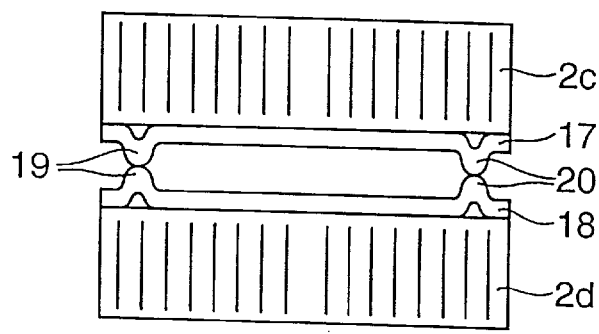
FIG. 9 is a schematic lateral view corresponding to FIG. 7 but for a modified double corrugated-fin complex which has metal end plates situated opposite one another in a punctiform manner as heat insulation devices.

FIG. 9 is a view corresponding to FIG. 7 and shows another implementation of the thermally decoupling double corrugated-fin complex. In this example, the two corrugated-fin units 2c, 2d of the double corrugated-fin complex are respectively provided on their mutually opposite sides with one metal end plate 17, 18. Both metal end plates 17, 18 have *punctiform, or as an alternative, linear beads, as a result of which corresponding punctiform or linear protrusions 19, 20 are formed on the mutually opposite metal end plate sides. The protrusions 19, 20 of both metal end plates 17, 18 are situated at corresponding points so that the two metal end plates 17, 18 rest against one another with an only punctiform or at most linear contact in the areas of the protrusions 19, 20. The at most linear contact between the two metal end plates 17, 18 permits at most only a slight heat transfer; no significant heat transfer takes place in the air gap area situated between these end plates. On the whole, the two metal end plates 17, 18, which at most have linear contacts, therefore act as a heat insulating device which is sufficient for causing the desired thermal decoupling between the corrugated-fin units 2c, 2d of the double corrugated-fin complex.

According to the invention, heat insulation between two adjacent tubes of a tube/fin block is provided at respective desired points by inserting a respective thermally decoupling double corrugated-fin complex. It is to be understood that double corrugated-fin complexes, equipped in this manner with a heat insulation device, can be used not only for heat exchangers with serpentine-type constructions as shown but also for heat exchangers of other construction types and whenever there is a demand for thermal decoupling of adjacent tubes of tube/fin heat exchanger blocks.

The foregoing disclosure has been set forth merely to illustrate the invention and is not intended to be limiting. Since modifications of the disclosed embodiments incorporating the spirit and substance of the invention may occur to persons skilled in the art, the invention should construed to include everything within the scope of the appended claims and equivalents thereof.

What is claimed is:

1. Tube/fin block for a heat exchanger comprising:
    several tubes, which are arranged side-by-side along a transverse direction of the block and through which a heat transfer fluid can flow,
    corrugated-fin complexes inserted between adjacent tubes of said several tubes and connected with said adjacent tubes, at least one of said corrugated fin-complexes being a double corrugated-fin complex with two corrugated-fin units arranged side-by-side in the transverse direction of the block, and
    a heat insulation device provided between the two corrugated-fin units of the double corrugated-fin complex.

2. Tube/fin block according to claim 1, wherein the two corrugated-fin units of the double corrugated-fin complex consist of a solderable material, and the heat insulation device is formed by a solderable separating metal plate provided with heat-insulating openings.

3. Tube/fin block according to claim 1, wherein the heat insulation device is formed by a separating metal plate provided with punctiform or linear protrusions on at least one of its sides.

4. Tube/fin block according to claim 1, wherein the heat insulation device is formed by a separating metal plate provided with a heat-insulating coating on at least one of its sides.

5. Tube/fin block according to claim 4, wherein the separating metal plate has position securing devices which secure the separating metal plate against moving out of a gap between the two corrugated-fin units.

6. Tube/fin block according to claim 1, wherein a heat-insulating air gap is formed as the heat insulation device between the two corrugated-fin units.

7. Tube/fin block according to claim 6, wherein corrugated fins of said corrugated-fin complexes consist of a non-solder-plated material and the tubes are provided with solder.

8. Tube/fin block according to claim 1, wherein the heat insulation device is formed by a plastic strip.

9. Tube/fin block according to claim 8, wherein at least one of the two corrugated-fin units is provided with a metal end plate on its side facing the plastic strip.

10. Tube/fin block according to claim 1, wherein the heat insulation device is formed by a nonwoven element made of a ceramic material or of a mineral fiber material.

11. Tube/fin block according to claim 10, wherein the nonwoven element is accommodated in a U-shaped separating metal plate which is connected by its flanks on an exterior side thereof with said two corrugated-fin units and is provided in a bending edge area interconnecting said flanks with heat-insulating openings.

12. Tube/fin block according to claim 1, wherein the heat insulation device is formed by two metal end plates which, by protrusions, rest against one another at most in a linear shape and, by their sides facing away from one another, are connected with the adjoining corrugated-fin units.

13. Tube/fin block according to claim 2, wherein said solderable separating metal plate is provided with a heat-insulating coating on at least one of its sides.

14. Tube/fin block according to claim 3, wherein said solderable separating metal plate is provided with a heat-insulating coating on at least one of its sides.

15. Tube/fin block according to claim 6, wherein at least one of the two corrugated-fin units is provided with a metal end plate on its side facing the heat-insulating air gap.

16. Tube/fin block according to claim 7, wherein at least one of the two corrugated-fin units is provided with a metal end plate on its side facing the heat-insulating air gap.

17. Process for manufacturing a tube/fin block according to claim 6, comprising the steps of:
    constructing the tube/fin block from the tubes and the corrugated-fin complexes situated between the adjacent tubes which are to be soldered to the adjacent tubes and a spacer plate made of a brazing-temperature resistant, non-solderable material inserted between the two corrugated-fin units of the double corrugated-fin complex, carrying out a brazing process with the constructed tube/fin block for brazing the tubes to the corrugated-fin complexes, and removing a spacer plate from the soldered tube/fin block to form the heat-insulating air gap between the two corrugated-fin units of the double corrugated-fin complex.

18. Process for manufacturing a tube/fin block according to claim 6, comprising the steps of constructing the tube/fin block from the tubes and the corrugated-fin complexes situated between the adjacent tubes which are to be soldered to the adjacent tubes and a spacer plate made of a brazing-temperature resistant, non-solderable material inserted between the two corrugated-fin units of the double corrugated-fin complex, carrying out a brazing process with the constructed tube/fin block for brazing the tubes to the corrugated-fin complexes, removing a spacer plate from the soldered tube/fin block to form the heat-insulating air gap, and inserting a plastic strip into the heat-insulating air gap formed by the removal of the spacer plate.

19. Tube/fin block for a heat exchanger comprising:

first and second serpentine tubes arranged side-by-side through which heat transfer fluid can flow, corrugated-fin units inserted between adjacent parallel tube sections of each of said serpentine tubes and connected with said adjacent parallel tube sections, at least one double corrugated-fin complex with two corrugated-fin units arranged side-by-side disposed between said first and second serpentine tubes, and a heat insulation device provided between the two corrugated-fin units of the double corrugated-fin complex.

20. Process for manufacturing a tube/fin block comprising the steps of:

inserting corrugated-fin complexes between adjacent tubes, inserting a spacer plate made of a brazing-temperature resistant, non-solderable material between one pair of adjacent corrugated-fin complexes, brazing the tubes to the corrugated-fin complexes, and removing the spacer plate from a soldered tube/fin block formed by soldering said tubes to produce a heat-insulating air gap between the adjacent corrugated-fin complexes.

21. Process according to claim 20 and further comprising the step of inserting a plastic strip into said heat-insulating air gap formed by removing said spacer plate.

* * * * *